United States Patent
Gray et al.

(10) Patent No.: US 10,813,280 B2
(45) Date of Patent: Oct. 27, 2020

(54) SPREADER FOR PARTICULATE MATERIAL

(71) Applicant: Salford Group Inc., Salford (CA)

(72) Inventors: Geof J. Gray, Burford (CA); John Mark Averink, Norwich (CA); Bradley William Baker, Stratford (CA); Jesse Abram Dyck, London (CA); Chad Derek Pasma, Beachville (CA); Adam Lehman, Kenilworth (CA); Dennis Rice, Starbuck (CA)

(73) Assignee: Salford Group Inc., Salford (CA)

( * ) Notice: Subject to any disclaimer, the term of this patent is extended or adjusted under 35 U.S.C. 154(b) by 0 days.

(21) Appl. No.: 16/497,194

(22) PCT Filed: Mar. 21, 2018

(86) PCT No.: PCT/CA2018/050339
§ 371 (c)(1),
(2) Date: Sep. 24, 2019

(87) PCT Pub. No.: WO2018/170594
PCT Pub. Date: Sep. 27, 2018

(65) Prior Publication Data
US 2020/0107496 A1 Apr. 9, 2020

Related U.S. Application Data

(60) Provisional application No. 62/476,383, filed on Mar. 24, 2017.

(51) Int. Cl.
*A01C 15/04* (2006.01)
*A01C 7/08* (2006.01)
(Continued)

(52) U.S. Cl.
CPC .............. *A01C 15/04* (2013.01); *A01C 7/082* (2013.01); *A01C 7/102* (2013.01); *A01C 15/006* (2013.01); *A01M 9/003* (2013.01)

(58) Field of Classification Search
CPC ......... A01C 15/04; A01C 15/00; A01C 7/082; A01C 7/081; A01C 7/08; A01C 7/00;
(Continued)

(56) References Cited

U.S. PATENT DOCUMENTS 4,569,486 A 2/1986 Balmer
4,852,809 A 8/1989 Davis et al.
(Continued)

FOREIGN PATENT DOCUMENTS

| CN | 202009569 U | 10/2011 |
| CN | 103582411 A | 2/2014 |
| CN | 105592687 A | 5/2016 |

OTHER PUBLICATIONS

International Search Report and Written Opinion dated Jun. 11, 2019 on PCT application PCT/CA2018/050339.
(Continued)

*Primary Examiner* — Christopher J. Novosad
(74) *Attorney, Agent, or Firm* — Brunet & Co. Ltd.; Robert Brunet; Hans Koenig (57) ABSTRACT

A spreader for spreading particulate material has a plurality of outlets transversely spaced-apart in a direction perpendicular to a direction of travel of the spreader. The outlets are configured to receive the material from a metering device and to dispense an amount of the material to mid-rows between crop rows on a field such that the plurality of outlets dispenses half the amount of material to an outermost mid-row compared to the amount of material dispensed to the other mid-rows. Also, the metering device may have two metering elements, which may be controlled to meter the material to only one side of the spreader. A centrally located outlet situated on a driving line of the spreader may receive material from both metering elements so that the centrally located nozzle can dispense the material whenever one or the other side of the spreader is not dispensing material.

19 Claims, 8 Drawing Sheets

(51) Int. Cl.
  *A01C 7/10*   (2006.01)
  *A01C 15/00*  (2006.01)
  *A01M 9/00*   (2006.01)

(58) Field of Classification Search
  CPC ......... A01C 7/102; A01C 7/10; A01C 15/006; A01C 15/005; A01M 9/003; A01M 9/0007; A01M 9/00
  See application file for complete search history.

(56) References Cited

U.S. PATENT DOCUMENTS

| | | |
|---|---|---|
| 5,052,627 A    | 10/1991 | Balmer |
| 5,267,696 A    | 12/1993 | Balmer |
| 5,950,933 A    | 9/1999  | Balmer |
| 9,265,193 B2   | 2/2016  | Snyder et al. |
| 2014/0048612 A1 | 2/2014 | Snyder et al. |
| 2015/0216108 A1 | 8/2015 | Roth et al. |
| 2016/0113191 A1 | 4/2016 | Rosengren et al. |
| 2016/0205867 A1 | 7/2016 | Montag et al. |

OTHER PUBLICATIONS

Office action dated Jan. 18, 2019 on Canadian application CA 3,010,384.
Office action dated Apr. 1, 2019 on Canadian application CA 3,010,384.
Office action dated Jul. 15, 2019 on Canadian application CA 3,010,384.
Notice of Allowance dated Sep. 4, 2019 on Canadian application CA 3,010,384.
Office action dated May 22, 2020 on Chinese application 201880032478.9.

SPREADER FOR PARTICULATE MATERIAL

CROSS-REFERENCE TO RELATED APPLICATIONS

This application is a national entry of International Application PCT/CA2018/050339 filed Mar. 21, 2018, which claims the benefit of U.S. Provisional Patent Application U.S. Ser. No. 62/476,383 filed Mar. 24, 2017, the entire contents of both of which are herein incorporated by reference.

FIELD

This application relates to agriculture, in particular to an apparatus for applying solid agricultural product to a field.

BACKGROUND

In modern agriculture, many crops (e.g. corn) are often planted by seeding a field with seed in evenly-spaced parallel rows. Seeding a field generally involves towing a seeding implement behind a towing vehicle (e.g. a tractor) such that the wheels of the towing vehicle and the wheels of the seeding implement follow the same path, and the seeds are planted in crop rows spaced-apart by a distance such that the wheels are between crop rows. The seeding implement generally has a plurality of transversely spaced-apart seed outlets so that a plurality of crop rows may be planted at the same time in a single swath as the towing vehicle drives in a driving line in one direction on the field. Currently, all such seeding implements comprise an even number of seed outlets, for example 12, 16, 18, 24, 36, 48, etc. seed outlets. When the towing vehicle and the seeding implement arrive at the end of the field, the towing vehicle and the seeding implement are shifted over and driven in a new driving line in the opposite direction to plant another swath of crop rows. The new driving line is chosen so that the spacing between all of the parallel crop rows in the field remains constant across the field. The new driving line is determined based on the location in the field of the previous driving line and on the number and spacing of seed outlets on the seeding implement. The driving lines may be stored as coordinates in a global positioning system (GPS) for future reference and/or for automating the planting.

After planting, it is often desirable to apply post-planting product (e.g. fertilizer, micronutrients, etc. or mixtures thereof) in between the crop rows (i.e. mid-rows). A different implement but the same towing vehicle are often used for application of post-planting product. Because axle width of the towing vehicle remains unchanged, to avoid driving on the crop rows during post-planting product application, the towing vehicle is driven on the same driving lines as was driven during planting. In order to apply post-planting product between the crop rows under such conditions, the implement used to apply post-planting product has a plurality of product outlets spaced-apart by substantially the same or a similar distance as the seed outlets on the seeding implement, but the outlets on the post-planting implement are transversely offset with respect to a centerline of the towing vehicle by an amount equal to about half the spacing distance. Alternative to towing a post-planting implement, a self-propelled vehicle may be used to apply post-planting product to the field. Nevertheless, the self-propelled vehicle should drive between rows and it is desirable for the self-propelled vehicle to drive on the same rows as the towing vehicle that towed the seeding implement in order to prevent excessive compaction. Such a practice is called tramlining where all traffic drives in same rows as much as possible.

Figure 1:
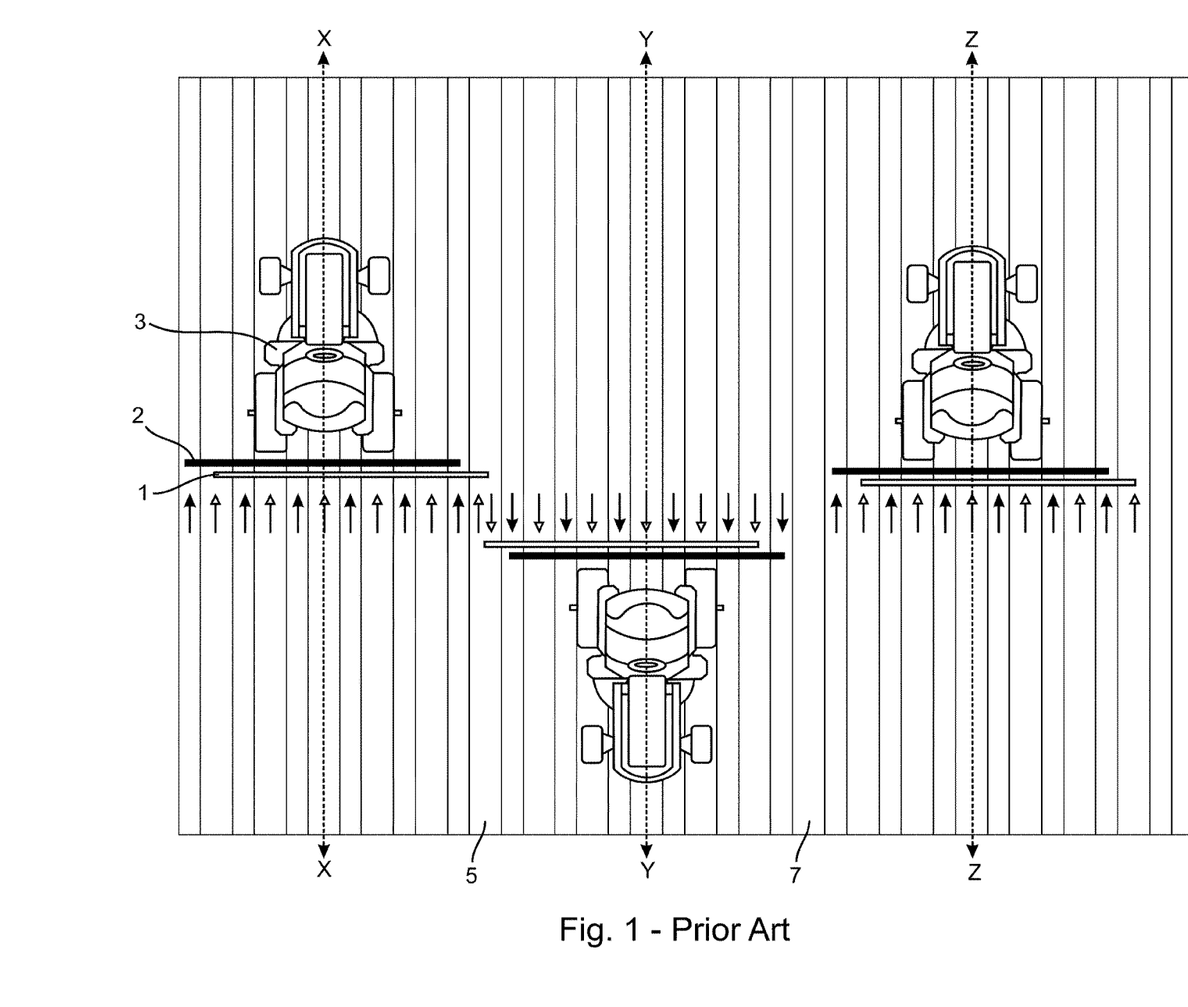
Figure 2:
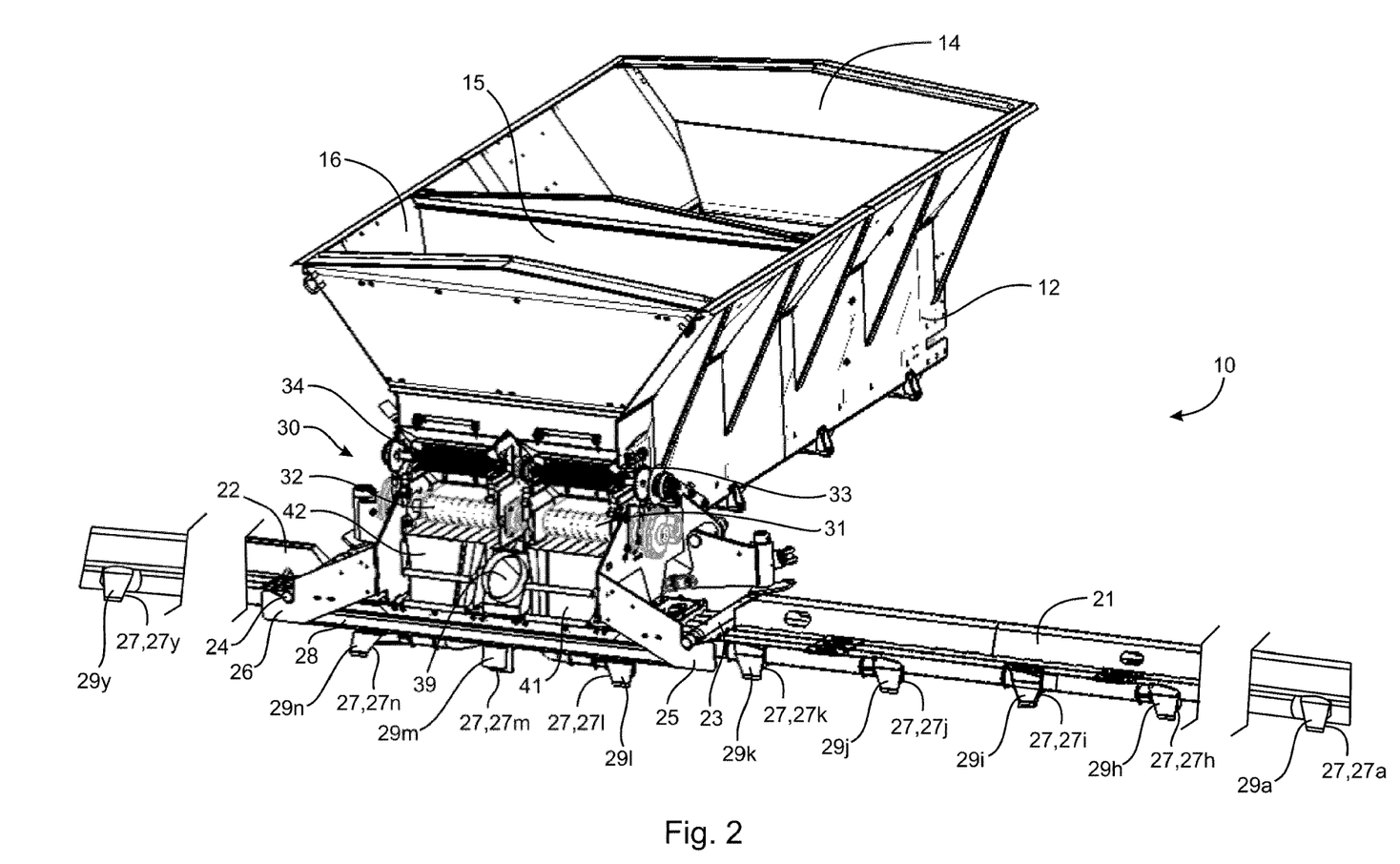
Figure 3:
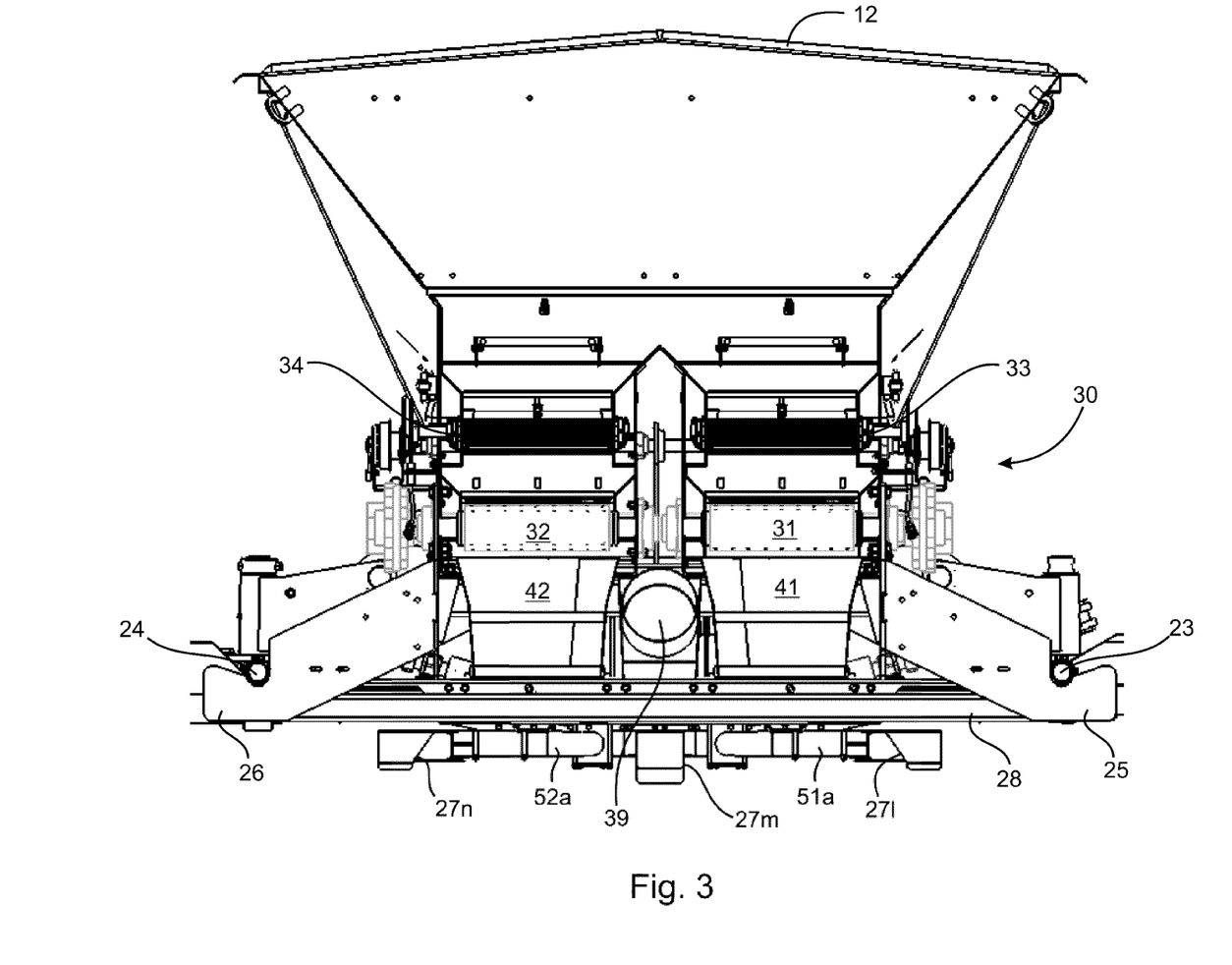
Figure 4:
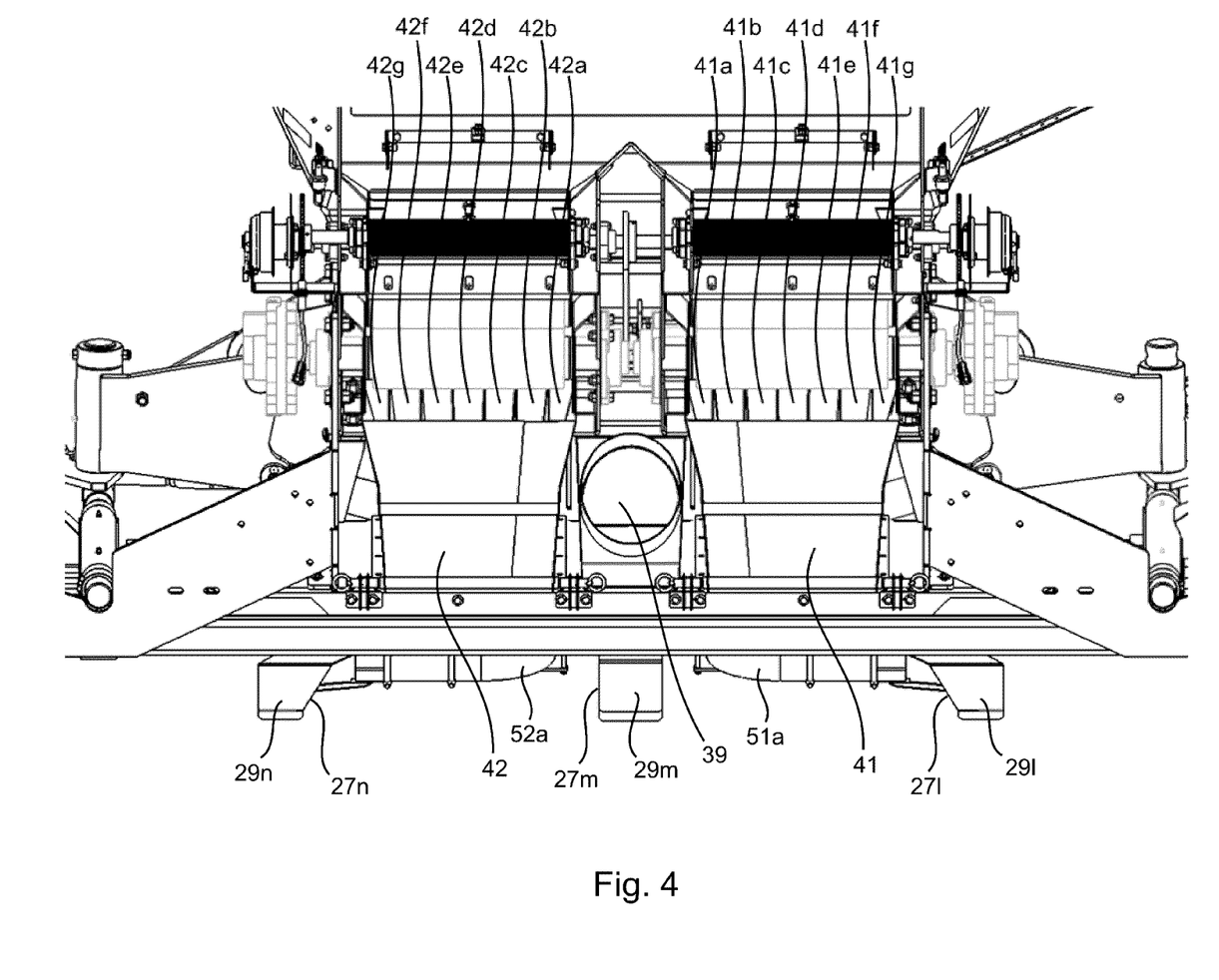
Figure 5:
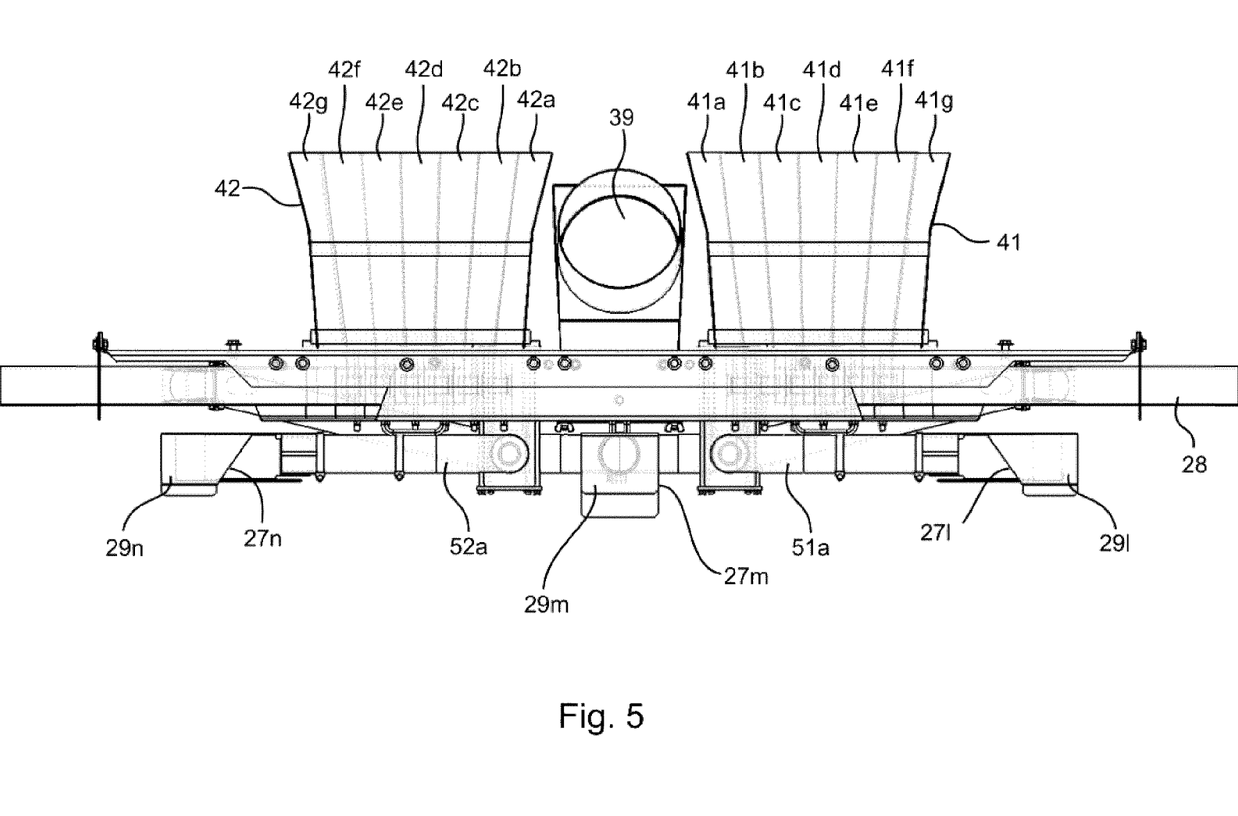
Figure 6:
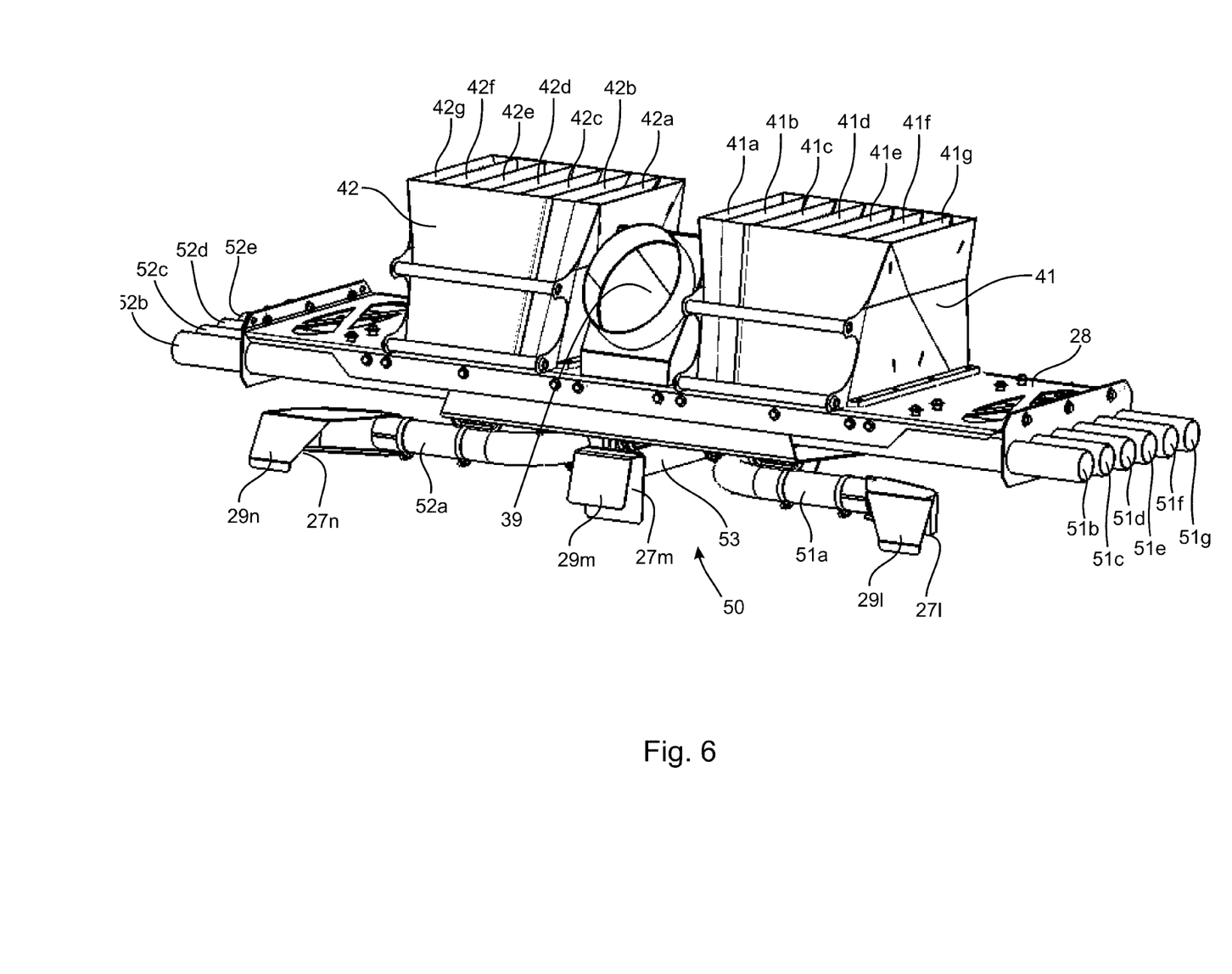
Figure 7:
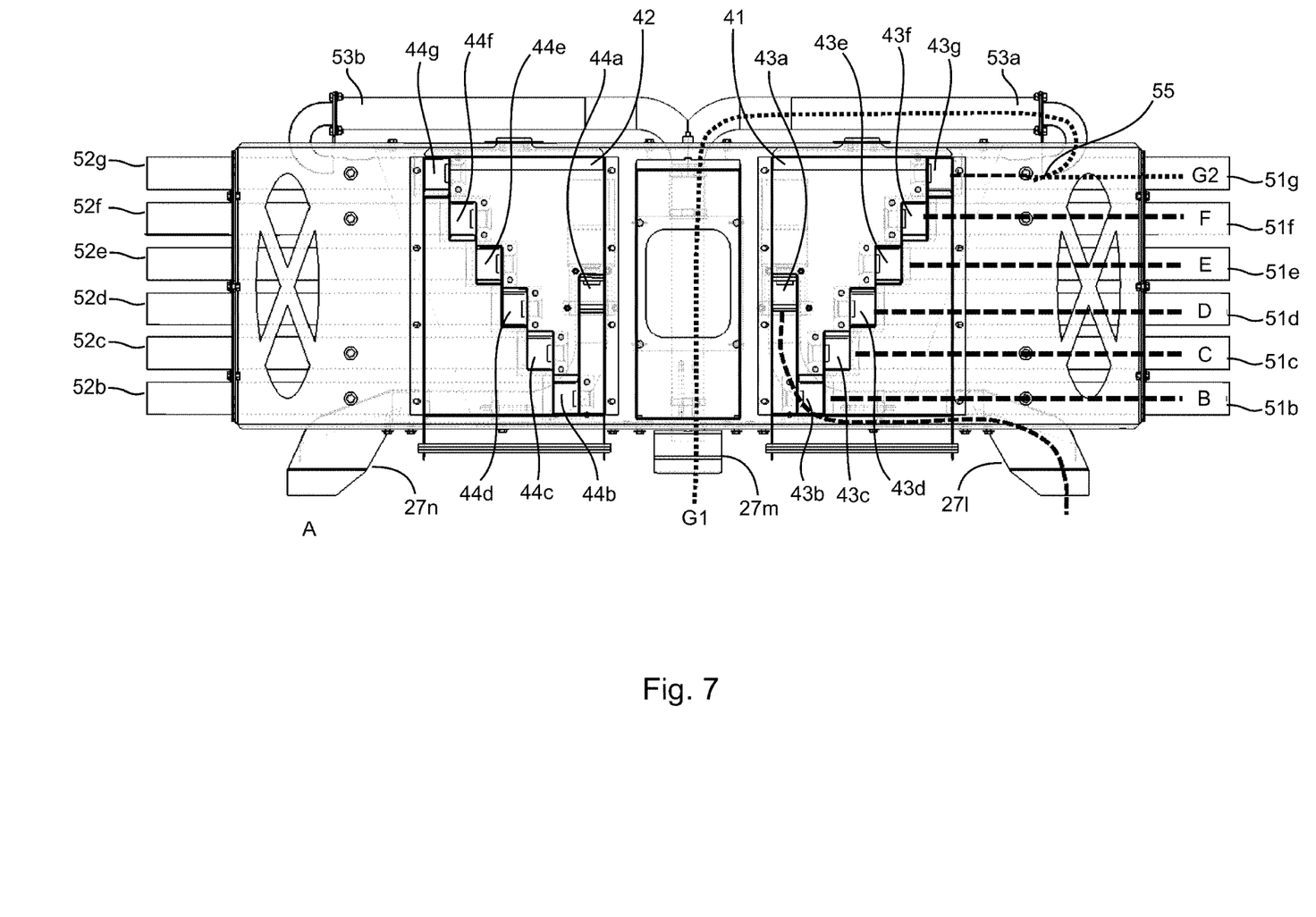

With reference to FIG. 1, irrespective of the number of outlets on a post-planting implement 1, when a towing vehicle 3 drives the same driving lines X-X, Y-Y, Z-Z towing the post-planting implement 1 as the vehicle 3 did towing a seeding implement 2 during planting, such an arrangement unfortunately results in some mid-rows receiving twice the desired amount of post-planting product, or some mid-rows receiving no post-planting product, or some mid-rows receiving twice the desired amount of post-planting product and others receiving none. Mid-rows are depicted by open-headed arrows in FIG. 1. Because the outlets on the post-planting implement 1 are offset from the lines followed by the outlets on the seeding implement 2, when the towing vehicle 3 makes a turn to drive in the opposite direction along the next driving line, the outlets on the post-planting implement 1 are transversely shifted in relation to crop rows. Crop rows are depicted by closed-headed arrows in FIG. 1. Having the same number of outlets on the post-planting implement 1 as were on the seeding implement 2 (in this case six outlets) results in doubling the amount of post-planting product applied in mid-row 5 and no post-planting product applied in mid-row 7 when a towing vehicle 3 is driving the same driving lines X-X, Y-Y, Z-Z as were driven during planting. Having fewer outlets on the post-planting implement would result in no doubling of post-planting product in a mid-row, but would result in more mid-rows receiving no post-planting product. Having more outlets on the post-planting implement would result in all mid-rows receiving post-planting product, but more mid-rows receiving double the amount of post-planting product.

The problem outlined above could be mitigated by shifting every second driving line during application of the post-planting product. However, shifting every second driving line is generally undesirable due to the difficulty in feeding from a fixed set of endless belts or meter rollers into a gated metering device and having a moveable boom to switch between rows. Such a solution requires many more moving parts, which can jam, wear out from movement and experience other problems associated with moving parts.

There remains a need for a post-planting implement that can apply the same amount of post-planting product to all the mid-rows between crop rows while being towed by a towing vehicle on the same driving lines used for planting the crop rows.

SUMMARY

A spreader for spreading particulate material on a field comprises a plurality of outlets transversely spaced-apart in a direction perpendicular to a direction of travel of the spreader. The outlets may be configured to receive the particulate material from a metering device and to dispense an amount of the particulate material to mid-rows between crop rows on a field such that the plurality of outlets dispenses half the amount of particulate material to an outermost mid-row compared to the amount of particulate material dispensed to the other mid-rows. In one aspect, the metering device may have two metering elements, which may be controlled to meter the particulate material to only one side of the spreader. A centrally located outlet situated on a driving line of the spreader may receive the particulate material from both metering elements so that the centrally located nozzle can dispense the particulate material whenever one or the other side of the spreader is not dispensing the particulate material. The particulate material may be a solid agricultural product, for example fertilizer, a micronutrient, a granular herbicide, a cover crop seed for interrow seeding or any mixture thereof.

In one aspect, there is provided a spreader for spreading particulate material on a field, the spreader comprising: a hopper configured to contain a particulate material; a metering device configured to receive the particulate material from the hopper; a plurality of outlets transversely spaced-apart in a direction perpendicular to a direction of travel of the spreader and configured to receive the particulate material from the metering device, the plurality of outlets further configured to dispense an amount of the particulate material to mid-rows between crop rows on a field, the mid-rows comprising an outermost mid-row and at least one other mid-row, the plurality of outlets dispensing half the amount of particulate material to the outermost mid-row compared to the amount of particulate material dispensed to the at least one other mid-row.

The at least one first outermost outlet and the at least one center outlet may receive particulate material from a single gate of the first metering element. The at least one first outermost outlet may receive half of the particulate material from the single gate of the first metering element to dispense half the amount of particulate material to the first outermost mid-row. The at least one center outlet may receive another half of the particulate material from the single gate of the first metering element to dispense half the amount of particulate material to the center mid-row. The at least one second outermost outlet and the at least one center outlet may receive particulate material from a single gate of the second metering element. The at least one second outermost outlet may receive half of the particulate material from the single gate of the second metering element to dispense half the amount of particulate material to the second outermost mid-row. The at least one center outlet may receive another half of the particulate material from the single gate of the second metering element to dispense half the amount of particulate material to the center mid-row.

The plurality of outlets may be configured to receive the particulate material from the plurality of gates through a plurality of air lines connecting the plurality of gates to the plurality of outlets. The particulate material may be transported through the air lines by an air stream. The air lines from the single gates may each split into two air lines to deliver the halves of the particulate material to the respective at least one outermost outlets and to the at least one center outlet.

In another aspect, there is provided a boom spreader for spreading particulate material on a field, the spreader comprising: a hopper configured to contain a particulate material; a metering device comprising first and second independently controllable metering elements, each metering element receiving the particulate material from the hopper, and a gate box having a plurality of gates therein that receive the particulate material from the metering element; a first boom and a second boom, the booms transversely extendible in opposite transverse directions substantially non-parallel to a direction of travel of the spreader and substantially non-perpendicular to a field; a plurality of outlets transversely spaced-apart in a direction perpendicular to the direction of travel of the spreader, the plurality of outlets comprising at least one first outermost outlet situated on the first boom, at least one second outermost outlet situated on the second boom and at least one center outlet situated over a travel line of the spreader, the plurality of outlets configured to receive the particulate material from the plurality of gates and to dispense an amount of the particulate material to mid-rows between crop rows on a field, the mid-rows comprising a center mid-row, a first outermost mid-row, a second outermost mid-row and at least two other mid-rows; the at least one first outermost outlet dispensing half the amount of particulate material to the first outermost mid-row compared to the amount of particulate material dispensed to the at least two other mid-rows, and the at least one second outermost outlet dispensing half the amount of particulate material to the second outermost mid-row compared to the amount of particulate material dispensed to the at least two other mid-rows.

The plurality of outlets may comprise at least one outermost outlet that dispenses the particulate material to the outermost mid-row. The spreader may further comprise a boom transversely extendible in a direction substantially non-parallel to a direction of travel of the spreader and substantially non-perpendicular to the field. The boom may have thereon the at least one outermost outlet.

The at least one other mid-row may comprise a center mid-row situated on a travel line of the spreader. The metering device may comprise first and second independently controllable metering elements. The first metering element may be configured to deliver half the amount of particulate material to the center mid-row. The second metering element may be configured to deliver half the amount of particulate material to the center mid-row.

The outermost mid-row may comprise a first outermost mid-row situated on a first side of the spreader and a second outermost mid-row situated on a second side of the spreader. The at least one other mid-row may comprise a center mid-row situated over a travel line of the spreader. The spreader may further comprise a first boom and a second boom. The first boom may be transversely extendible on the first side of the spreader in a direction substantially non-parallel to a direction of travel of the spreader and substantially non-perpendicular to the field. The second boom may be transversely extendible on the second side of the spreader in a direction substantially non-parallel to a direction of travel of the spreader and substantially non-perpendicular to the field. The plurality of outlets may comprise at least one first outermost outlet situated on the first boom and at least one second outermost outlet situated on the second boom. The at least one first outermost outlet may dispense half the amount of particulate material to the first outermost mid-row. The at least one second outermost outlet may dispense half the amount of the particulate material to the second outermost mid-row. The metering device may comprise first and second independently controllable metering elements. The first metering element may be configured to deliver half the amount of particulate material to the center mid-row. The second metering element may be configured to deliver half the amount of particulate material to the center mid-row. The spreader may further comprise a plurality of air lines and a blower configured to transport the particulate material from the metering device to the plurality of outlets.

The first metering element may comprise an apron that receives the particulate material from the hopper. The first metering element may comprise a gate box having a plurality of gates therein that receive the particulate material from the apron. One of the plurality of gates may deliver half the amount of particulate material to the at least one first outermost outlet. The gate that delivers the particulate material to the at least one first outermost outlet may also deliver the particulate material to at least one center outlet to dispense half the amount of particulate material to the center mid-row. The second metering element may be constructed like the first metering element or differently from the first metering element. The second metering element may be configured to deliver the particulate material to the at least one second outermost outlet. The second metering element may be configured to deliver the particulate material to the at least one center outlet to dispense half the amount of particulate material to the center mid-row. The apron may comprise an endless belt or a set of meter rollers.

In another aspect there is provided a method of applying particulate material to a field using a boom spreader, the method comprising: driving a boom spreader in a first direction along a first driving line in a first swath of a field planted with a crop, the field comprising a plurality of mid-rows between a plurality of crop rows, the mid-rows in the first swath comprising first and second outermost mid-rows and at least one mid-row between the first and second outermost mid-rows, the boom spreader comprising a plurality of transversely spaced-apart outlets through which a particulate material is applied to the mid-rows, the plurality of transversely spaced-apart outlets comprising first and second outermost outlets configured to apply the particulate material to the first and second outermost mid-rows and at least one inner outlet configured to apply the particulate material to the at least one mid-row between the first and second outermost mid-rows; applying a particulate material to the first and second outermost mid-rows in an amount that is about half an amount of the particulate material applied to the at least one mid-row between the first and second outermost mid-rows; driving the boom spreader along a second driving line in a second swath of the field in a second direction opposite the first direction, the second swath comprising the second outermost mid-row, a third outermost midrow and at least one mid-row between the second and third outermost mid-rows, the first and second outermost outlets configured to apply the particulate material to the second and third outermost mid-rows and the at least one inner outlet configured to apply the particulate material to the at least one mid-row between the second and third outermost mid-rows; and, applying the particulate material to the second and third outermost mid-rows in an amount that is about half an amount of the particulate material applied to the at least one mid-row between the second and third outermost mid-rows, the second outermost mid-row thereby receiving about the same amount of the particulate material as the at least one mid-row between the first and second outermost mid-rows of the first swath and about the same amount of the particulate material as the at least one mid-row between the second and third outermost mid-rows of the second swath.

The boom spreader may comprise at least one innermost outlet configured to apply the particulate material to the at least one mid-row on the driving line between the outermost mid-rows. The boom spreader may further comprise first and second booms transversely extendible over the field on either side of the spreader. The first boom may comprise the first outermost outlet and at least one other outlet between the first outermost outlet and the at least one innermost outlet. The second boom may comprise the second outermost outlet and at least one other outlet between the second outermost outlet and the at least one innermost outlet. The boom spreader may further comprise a metering device. The metering device may comprise first and second independently controllable metering elements. The first metering element may deliver the particulate material to the outlets on the first boom and the at least one innermost outlet. The first outermost outlet and the innermost outlet may receive about half the amount of particulate material as the at least one other outlet. The second metering element may deliver the particulate material to the outlets on the second boom and the at least one innermost outlet. The second outermost outlet and the innermost outlet may receive about half the amount of particulate material as the at least one other outlet. The first metering element may be switched off when the first boom is over a portion of the field, which has already received the particulate material or which is not intended to receive the particulate material.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

For clearer understanding, preferred embodiments will now be described in detail by way of example, with reference to the accompanying drawings, in which:

FIG. 1 depicts a schematic diagram showing how three successive passes of a prior art post-planting implement towed by a towing vehicle in a field can cause double application of post-planting product in one mid-row while no application of post-planting product in another mid-row when the towing vehicle drives the same driving lines used for planting crop rows;

FIG. 2 depicts a portion of a boom spreader for spreading solid agricultural product;

FIG. 3 depicts a rear end view of the boom spreader of FIG. 2 providing a magnified view of a product metering apparatus;

FIG. 4 depicts a magnified view of FIG. 3 omitting a hopper;

FIG. 5 depicts a rear end view of gate boxes of the product metering apparatus of

FIG. 3;

FIG. 6 depicts a rear perspective view of the gate boxes of FIG. 5 together with air lines;

FIG. 7 depicts a top view of the gate boxes of FIG. 5 showing paths that the product follows in the air lines; and, FIG. 8 depicts a schematic diagram showing how three successive passes of a boom spreader of the present invention towed by a towing vehicle in a field can provide appropriate amount of the solid agricultural product to all mid-rows in the field when the towing vehicle drives the same driving lines used for planting crop rows.

DETAILED DESCRIPTION

With reference to FIG. 2, FIG. 3, FIG. 4, FIG. 5, FIG. 6 and FIG. 7, a boom spreader 10 for spreading solid particulate material (e.g. solid agricultural product such as fertilizer, micronutrients and the like) on a terrain (e.g. a field) comprises a hopper 12 for containing the solid particulate material. As seen in FIG. 2, the hopper 12 is a dual compartment hopper having two bins 14, 16 for containing two types of particulate material and separated by a partition 15. However, the hopper may comprise any number of compartments. The hopper 12 is normally supported on a frame (not shown), which can be towed behind or supported on a vehicle (not shown) such as a tractor, truck or the like. When the spreader is towed, the frame would normally be supported on wheels to enable towing of the spreader.

The spreader 10 also comprises first and second extendible booms 21, 22 mounted on first and second sides of the spreader 10, respectively, which are extendible horizontally over the field in a direction transverse to a longitudinal axis of the spreader 10 and transverse to a direction of travel of the spreader 10 on the field. To allow movement of the booms 21, 22 between a vertical stowed position and a horizontal operating position, the booms 21, 22 rotate about mounting pins 23, 24, respectively mounted in mounting brackets, 25, 26, respectively.

A plurality of particle delivery nozzles 27 (only nine of twenty-five shown and labeled as 27a, 27h, 27i, 27j, 27k, 27l, 27m, 27n, 27y) are mounted on the booms 21, 22 and on a support frame 28 for the booms 21, 22. The nozzles 27 are shown covered by deflectors 29a, 29h, 29i, 29j, 29k, 29l, 29m, 29n, 29y to direct particulate material downward toward the field. The nozzle 27m is a central nozzle that applies the particulate material to a mid-row under a centerline of the spreader 10, which is also a travel line for the spreader 10 when the spreader 10 is traveling across the field. While each of the nozzles 27 may comprise a single nozzle, it will be understood that any one or more of the nozzles 27 may, in fact, comprise more than one nozzle.

The particulate material in the hopper 10 is metered into an air system 50 for transport to the nozzles 27 by a metering apparatus 30 comprising a first set of two independently controllable endless belts 31, 32 and a second set of two independently controllable endless belts 33, 34. The first set of endless belts 31, 32 transports particulate material from the bin 14, while the second set of endless belts 33, 34 transports particulate material form the bin 16. The sets of endless belts 31, 32 and 33, 34 are disposed under openings in the respective bins 14 and 16 to receive the particulate material flowing from the bins 14 and 16 under the influence of gravity. The sets of endless belts 31, 32 and 33, 34 may be operated serially to meter one type of particulate material at a time, or simultaneously to meter two types of particulate material at the same time. While two sets of endless belts are illustrated, the spreader may comprise any number of endless belts, although it is preferred that there is one set of endless belts per bin in the hopper. While endless belts are illustrated, any of the independently controllable metering elements could be an endless belt or a set of meter rollers. Therefore, any number of endless belts and sets of meter rollers may be present in the metering apparatus. For example, one or more of the endless belts may be replaced by sets of meter rollers or sets of meter rollers may be included in addition to the endless belts. In one example, the second set of endless belts may be replaced by two sets of meter rollers, one set of meter rollers replacing one of the endless belts in the second set and another set of meter rollers replacing the other of the endless belts in the second set.

The metering apparatus 30 also comprises a first gate box 41 and a second gate box 42 disposed under the endless belts 31, 33 and 32, 34, respectively, which receive the particulate material from the sets of endless belts 31, 33 and 32, 34. The first gate box 41 receives the particulate material from the endless belts 31 and/or 33, while the second gate box 42 receives the particulate material from the endless belts 32 and/or 34. As described in more detail below, the first gate box 41 meters the particulate material for delivery to the nozzles 27 on the first side of the spreader 10, while the second gate box 42 meters the particulate material for delivery to the nozzles 27 on the second side of the spreader 10. As further described in more detail below, both gate boxes 41 and 42 meter the particulate material to the central nozzle 27*m*. The central nozzle 27*m* may therefore conveniently comprise, if desired, two side-by-side nozzles receiving the particulate material from different gate boxes but applying the particulate material to the same mid-row, in this case the mid-row under the centerline of the spreader. Alternatively, the central nozzle 27*m* may be a single nozzle with the streams of the particulate material from the gate boxes 41 and 42 being combined before reaching the central nozzle 27*m*.

The first gate box 41 comprises individual gates 41*a*, 41*b*, 41*c*, 41*d*, 41*e*, 41*f*, 41*g*, which are parallel vertical channels separated from each other by walls from a top of the first gate box 41 to the bottom of the first gate box 41. Each of the gates 41*a*, 41*b*, 41*c*, 41*d*, 41*e*, 41*f*, 41*g* of the first gate box 41 taper inwardly toward the bottom of the gate box 41 where they open through respective gate outlets 43*a*, 43*b*, 43*c*, 43*d*, 43*e*, 43*f*, 43*g* to meter the particulate material into the air system 50 to be delivered by an air stream in the air system 50 to the nozzles 27 primarily on the first side of the spreader 10 where the particulate material is applied to the mid-rows in the field. The second gate box 42 likewise comprises individual gates 42*a*, 42*b*, 42*c*, 42*d*, 42*e*, 42*f*, 42*g* having respective gate outlets 44*a*, 44*b*, 44*c*, 44*d*, 44*e*, 44*f*, 44*g* at the bottom of the gate box 42 for metering the particulate to the nozzles 27 primarily on the second side of the spreader 10. Also, the gate 41*g* delivers the particulate material both to a first outermost nozzle 27*a* (see FIG. 2) on the first side of the spreader 10 and to the central nozzle 27*m*, while the gate 42*g* delivers the particulate material both to a second outermost nozzle 27*y* (see FIG. 2) on the second side of the spreader 10 and to the central nozzle 27*m*.

As best seen in FIG. 6 and FIG. 7, the air system 50 may comprise a blower (not shown) that blows air through a main blower line 39 into air lines 51*a*, 51*b*, 51*c*, 51*d*, 51*e*, 51*f*, 51*g*, 52*a*, 52*b*, 52*c*, 52*d*, 52*e*, 52*f*, 52*g*, 53*a*, 53*b*, which receive the particulate material from the gate boxes 41, 42. The following describes how the particulate material is metered on the first side of the spreader 10 to apply a desired amount of the particulate material through the nozzles 27 to the mid-rows. Because a mid-row is between two crop rows, the desired amount of the particulate material is an amount sufficient to service both of the two crop rows.

The gate outlet 43*a* and/or the gate 41*a* have a cross-sectional area appropriate for metering the desired amount of the particulate material to the air line 51*a*. Thus, the air line 51*a* receives the desired amount of the particulate material from the outlet 43*a* to deliver the particulate material along air stream A to the nozzle 27*l*, where the desired amount of particulate material is applied to the mid-row serviced by the nozzle 27*l*.

The gate outlet 43*b* and/or the gate 41*b* have a cross-sectional area appropriate for metering twice the desired amount of the particulate material to the air line 51*b*. Thus, the air line 51*b* receives the particulate material from the outlet 43*b* of the gate 41*b* to deliver the particulate material along air stream B to two nozzles 27*j* and 27*k*. The air line 51*b* splits into two air lines (not shown), one for delivering the desired amount of the particulate material to the nozzle 27*j* and another for delivering the desired amount of the particulate material to the nozzle 27*k*. The air line 51*b* receives twice the desired amount of the particulate material because the air line 51*b* delivers the particulate material to two nozzles.

The gate outlet 43*c* and/or the gate 41*c* have a cross-sectional area appropriate for metering twice the desired amount of the particulate material to the air line 51*c*. Thus, the air line 51*c* receives the particulate material from the outlet 43c of the gate 41c to deliver the particulate material along air stream C to two nozzles 27h and 27i. The air line 51c splits into two air lines (not shown), one for delivering the desired amount of the particulate material to the nozzle 27h and another for delivering the desired amount of the particulate material to the nozzle 27i. The air line 51c receives twice the desired amount of the particulate material because the air line 51c delivers the particulate material to two nozzles.

The gate outlet 43d and/or the gate 41d have a cross-sectional area appropriate for metering twice the desired amount of the particulate material to the air line 51d. Thus, the air line 51d receives the particulate material from the outlet 43d of the gate 41d to deliver the particulate material along air stream D to two nozzles (not shown). The air line 51d splits into two air lines (not shown), for delivering the particulate material to the two nozzles associated with the gate 41d. The air line 51d receives twice the desired amount of the particulate material because the air line 51d delivers the particulate material to two nozzles.

The gate outlet 43e and/or the gate 41e have a cross-sectional area appropriate for metering twice the desired amount of the particulate material to the air line 51e. Thus, the air line 51e receives the particulate material from the outlet 43e of the gate 41e to deliver the particulate material along air stream E to two nozzles (not shown). The air line 51e splits into two air lines (not shown), for delivering the particulate material to the two nozzles associated with the gate 41e. The air line 51e receives twice the desired amount of the particulate material because the air line 51e delivers the particulate material to two nozzles.

The gate outlet 43f and/or the gate 41f have a cross-sectional area appropriate for metering twice the desired amount of the particulate material to the air line 51f. Thus, the air line 51f receives the particulate material from the outlet 43f of the gate 41f to deliver the particulate material along air stream F to two nozzles (not shown). The air line 51f splits into two air lines (not shown), for delivering the particulate material to the two nozzles associated with the gate 41f. The air line 51f receives twice the desired amount of the particulate material because the air line 51f delivers the particulate material to two nozzles.

The gate outlet 43g and/or the gate 41g have a cross-sectional area appropriate for metering the desired amount of the particulate material to a single air line (not shown) at the gate outlet 43g. The single air line at the gate outlet 43g splits into the air lines 51g and 53a at a splitter shown at 55 where air streams G1 and G2 diverge downstream of the gate outlet 43g. Thus, both the air line 51g and the air line 53a receive the particulate material from the outlet 43g, but the air lines 51g and 53a each receive only half the desired amount of the particulate material. The air stream G1 delivers half the desired amount of the particulate material to the central nozzle 27m. The air stream G2 delivers half the desired amount of the particulate material to the first outermost nozzle 27a.

Figure 8:
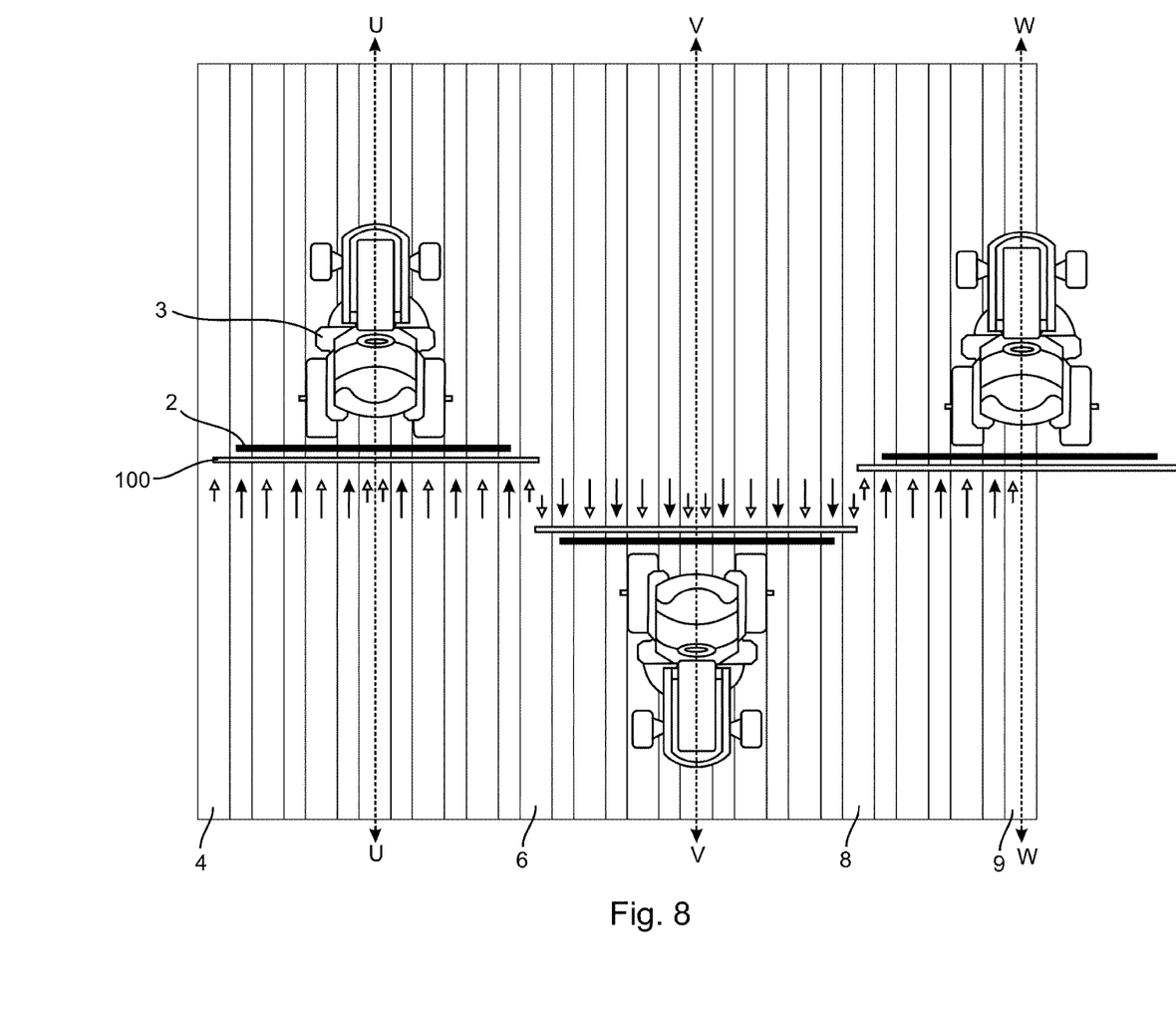

While the gates 41b, 41c, 41d, 41e and 41f in the spreader 10 each service two nozzles in order to economize space at the metering apparatus 30, any one or more of such gates may each service only one nozzle, in which case the one or more gates each servicing only one nozzle would meter the desired amount of the particulate material into the air line instead of twice the amount. Likewise, any one or more of such gates may each service more than two nozzles (i.e. three or more nozzles), in which case the one or more gates would each meter a multiple of the desired amount of the particulate material into the air line, the multiple for each gate being equal to the number of nozzles being serviced by each gate, and the air line being split downstream into a number of air lines equal to the multiple.

The metering apparatus 30 and the air system 50 on the second side of the spreader 10 are mirrors of the metering apparatus 30 and the air system 50 on the first side of the spreader 10. Thus, the same description as above applies to the gates 42$a$, 42$b$, 42$c$, 42$d$, 42$e$, 42$f$, 42$g$ and air lines 52$b$, 52$c$, 52$d$, 52$e$, 52$f$, 52$g$, 53$b$. As a result, all of the nozzles 27 between the first outermost nozzle 27$a$ and the central nozzle 27$m$ and all of the nozzles 27 between the second outermost nozzle 27$y$ and the central nozzle 27$m$ receive the desired amount of the particulate material to be applied to their respective mid-rows. Further, all of the nozzles 27 between the first outermost nozzle 27$a$ and the central nozzle 27$m$ receive the particulate material only from the first gate box 41, which receives the particulate material only from the first set of endless belts 31, 32. Likewise, all of the nozzles 27 between the second outermost nozzle 27$y$ and the central nozzle 27$m$ receive the particulate material only from the second gate box 42, which receives the particulate material only from the second set of endless belts 33, 34.

The first outermost nozzle 27$a$ also receives the particulate material only from the first gate box 41, but the first outermost nozzle 27$a$ only receives half the desired amount of the particulate material. Likewise, the second outermost nozzle 27$y$ receives the particulate material only from the second gate box 42, but the first outermost nozzle 27$y$ only receives half the desired amount of the particulate material. The central nozzle 27$m$ receives the particulate material from both the first and second gate boxes 41, 42, half the desired amount from the first gate box 41 and half the desired amount from the second gate box 42 for a total amount equal to the desired amount of the particulate material. Thus, for a given swath in the field when the spreader 10 is traveling in one direction, the outermost mid-rows only receive half the desired amount of the particulate material while all of the mid-rows between the outermost mid-rows receive the desired amount of the particulate material.

FIG. 8 shows how a seven-nozzle spreader 100 designed in accordance with the principles described above for the twenty-five-nozzle spreader 10 can provide an appropriate amount of solid agricultural product to all mid-rows in a field when the towing vehicle 3 drives the same driving lines U-U, V-V, W-W that were used for planting crop rows with the seeding implement 2. In FIG. 8, the mid-rows are depicted by open-headed arrows and the crop rows are depicted by closed-headed arrows.

As seen in FIG. 8, when traveling a first swath along the driving line U-U, the spreader 100 applies the desired amount of agricultural product (depicted by full length open-headed arrows) to mid-rows in the swath between an outermost mid-row 4 and an outermost mid-row 6. However, the outermost mid-row 4 and the outermost mid-row 6 only receive half the desired amount of agricultural product (depicted by a shortened open-headed arrow). A central mid-row on the driving U-U receives the desired amount of agricultural product as depicted by two shortened open-headed arrows to represent that the agricultural product applied to the central mid-row comes from both of the gate boxes on the spreader 100.

When the spreader 100 makes a turn to travel in the opposite direction along the driving line V-V in a second swath, the spreader 100 applies half the desired amount of agricultural product to both the outermost mid-row 6 and an outermost mid-row 8 of the second swath. The first and second swaths overlap only along the outermost mid-row 6 so that completion of the first and second swaths results in the outermost mid-row 6 receiving the desired amount of agricultural product. When the spreader 100 again makes a turn to travel in the opposite direction along the driving line W-W in a third swath, the overlap between swaths is repeated and so that completion of the second and third swaths results in the outermost mid-row 8 receiving the desired amount of agricultural product. The process may be repeated across the entire width of the field to evenly apply the desired amount of agricultural product to all the mid-rows between the crop rows. Because the towing vehicle 3 is driving the same driving lines U-U, V-V and W-W as were driven during planting, the same towing vehicle may be used for planting seed and spreading agricultural product without driving on the crop rows, thereby avoiding damage to the crops.

Still referring to FIG. 8, the field has two outermost edges 101, 102. In FIG. 8, the outermost mid-row 4 is an edge-row at the edge 101 of the field. Being an edge-row, the outermost mid-row 4 is not between two crop rows, but borders along only one crop row. Further, the outermost mid-row 4 only ever receives half the amount of agricultural product as the mid-rows 6 and 8. However, because the outermost mid-row 4 is an edge-row that borders only one crop row, the agricultural product applied to the outermost mid-row 4 only needs to service one crop row instead of two. Half the amount of agricultural product applied to an edge-row when compared to the amount applied to a mid-row between two crop rows is an appropriate amount for the edge-row, therefore, half the desired amount of agricultural product is an appropriate amount for the outermost mid-row 4, which in FIG. 8 is an edge-row.

In some instances, it is desirable to be able to apply particulate material (e.g. agricultural product) on one side of the driving line but not the other. Such instances can occur at an edge of a field, at edges of unplanted portions of a field or at edges of a portion of a field that have already received the particulate material. At such edges, it is undesirable to waste agricultural product by spreading the product beyond the edges. In spreaders of the present invention, the endless belts are independently controllable. By switching off the belt or belts on one side of the spreader, it is possible to apply particulate material at only one side of the spreader. Advantageously, switching off the belts on one side of the spreader does not change how the spreader can provide an appropriate amount of solid agricultural product to all mid-rows in a field when the towing vehicle drives the same driving lines that were used for planting crop rows with the seeding implement. Because the central nozzle receives half the desired amount of particulate material from one gate and half the desired amount from the other gate, switching off the belts on one side of the metering apparatus results in the central nozzle still receiving half the desired amount of particulate material from the belts on the other side of the metering apparatus. In effect, the central nozzle becomes an outermost nozzle. Therefore, the spreader of the present invention may provide sectional control over the spreading of solid agricultural product while at the same time not losing the ability to provide an appropriate amount of the solid agricultural product to all mid-rows in the field.

With reference to FIG. 8, when the spreader 100 is traveling along the driving line W-W at the outermost edge 102 of the field, the endless belts on the right side of the metering apparatus of the spreader 100 are switched off to prevent application of the agricultural product beyond an edge-row 9, the edge-row 9 being a mid-row on the driving line W-W. The endless belts on the left side of the metering apparatus of the spreader 100 remain switched on to provide the desired amount of agricultural product to the mid-rows at the left side of the spreader, including half the desired amount of agricultural product to the outermost mid-row 8, which had already received half the desired amount of agricultural product from the spreader 100 while the spreader 100 traveled the driving line V-V. In addition, the edge-row 9 on the driving line W-W is effectively an outermost mid-row receiving half the desired amount of agricultural product from the central nozzle of the spreader 100, which, as discussed previously, is an appropriate amount of agricultural product for an edge-row.

The novel features will become apparent to those of skill in the art upon examination of the description. It should be understood, however, that the scope of the claims should not be limited by the embodiments, but should be given the broadest interpretation consistent with the wording of the claims and the specification as a whole.

The invention claimed is:

1. A boom spreader for spreading particulate material on a field, the spreader comprising:
  a hopper configured to contain a particulate material;
  a metering device comprising first and second independently controllable metering elements, each metering element receiving the particulate material from the hopper, and a gate box having a plurality of gates therein that receive the particulate material from the metering element;
  a first boom and a second boom, the booms transversely extendible in opposite transverse directions substantially non-parallel to a direction of travel of the spreader and substantially non-perpendicular to a field;
  a plurality of outlets transversely spaced-apart in a direction perpendicular to the direction of travel of the spreader, the plurality of outlets comprising at least one first outermost outlet situated on the first boom, at least one second outermost outlet situated on the second boom and at least one center outlet situated over a travel line of the spreader, the plurality of outlets configured to receive the particulate material from the plurality of gates and to dispense an amount of the particulate material to mid-rows between crop rows on a field, the mid-rows comprising a center mid-row, a first outermost mid-row, a second outermost mid-row and at least two other mid-rows;
  the at least one first outermost outlet dispensing half the amount of particulate material to the first outermost mid-row compared to the amount of particulate material dispensed to the at least two other mid-rows, and the at least one second outermost outlet dispensing half the amount of particulate material to the second outermost mid-row compared to the amount of particulate material dispensed to the at least two other mid-rows.

2. The spreader of claim 1, wherein the at least one first outermost outlet and the at least one center outlet receive particulate material from a single gate of the first metering element, the at least one first outermost outlet receiving half of the particulate material from the single gate of the first metering element to dispense half the amount of particulate material to the first outermost mid-row, and the at least one center outlet receiving another half of the particulate material from the single gate of the first metering element to dispense half the amount of particulate material to the center mid-row, and wherein the at least one second outermost outlet and the at least one center outlet receive particulate material from a single gate of the second metering element, the at least one second outermost outlet receiving half of the particulate material from the single gate of the second metering element to dispense half the amount of particulate material to the second outermost mid-row, and the at least one center outlet receiving another half of the particulate material from the single gate of the second metering element to dispense half the amount of particulate material to the center mid-row.

3. The spreader of claim 2, wherein the plurality of outlets is configured to receive the particulate material from the plurality of gates through a plurality of air lines connecting the plurality of gates to the plurality of outlets, the particulate material being transported through the air lines by an air stream, and wherein the air lines from the single gates each split into two air lines to deliver the halves of the particulate material to the respective at least one outermost outlets and to the at least one center outlet.

4. The spreader of claim 1, wherein the metering elements comprise endless belts or sets of meter rollers or a combination of at least one endless belt and at least one set of meter rollers.

5. The spreader of claim 1, wherein the particulate material comprises a fertilizer.

6. A spreader for spreading particulate material on a field, the spreader comprising:
   a hopper configured to contain a particulate material;
   a metering device configured to receive the particulate material from the hopper;
   a plurality of outlets transversely spaced-apart in a direction perpendicular to a direction of travel of the spreader and configured to receive the particulate material from the metering device, the plurality of outlets further configured to dispense an amount of the particulate material to mid-rows between crop rows on a field, the mid-rows comprising an outermost mid-row and at least one other mid-row, the plurality of outlets dispensing half the amount of particulate material to the outermost mid-row compared to the amount of particulate material dispensed to the at least one other mid-row.

7. The spreader of claim 6, wherein the plurality of outlets comprises at least one outermost outlet that dispenses the particulate material to the outermost mid-row, and the spreader further comprises a boom transversely extendible in a direction substantially non-parallel to a direction of travel of the spreader and substantially non-perpendicular to the field, the boom having thereon the at least one outermost outlet.

8. The spreader of claim 6, wherein the at least one other mid-row comprises a center mid-row situated on a travel line of the spreader, and the metering device comprises first and second independently controllable metering elements, the first metering element configured to deliver half the amount of particulate material to the center mid-row and the second metering element configured to deliver half the amount of particulate material to the center mid-row.

9. The spreader of claim 6, wherein:
   the outermost mid-row comprises a first outermost mid-row situated on a first side of the spreader and a second outermost mid-row situated on a second side of the spreader;
   the at least one other mid-row comprises a center mid-row situated over a travel line of the spreader;
   the spreader further comprises a first boom and a second boom, the first boom transversely extendible on the first side of the spreader in a direction substantially non-parallel to a direction of travel of the spreader and substantially non-perpendicular to the field, the second boom transversely extendible on the second side of the spreader in a direction substantially non-parallel to a direction of travel of the spreader and substantially non-perpendicular to the field;
   the plurality of outlets comprises at least one first outermost outlet situated on the first boom and at least one second outermost outlet situated on the second boom, the at least one first outermost outlet dispensing half the amount of particulate material to the first outermost mid-row, the at least one second outermost outlet dispensing half the amount of the particulate material to the second outermost mid-row; and,
   the metering device comprises first and second independently controllable metering elements, the first metering element configured to deliver half the amount of particulate material to the center mid-row and the second metering element configured to deliver half the amount of particulate material to the center mid-row.

10. The spreader of claim 9, wherein the first metering element comprises: an apron that receives the particulate material from the hopper; and, a gate box having a plurality of gates therein that receive the particulate material from the apron, wherein one of the plurality of gates delivers half the amount of particulate material to the at least one first outermost outlet.

11. The spreader of claim 10, wherein the gate that delivers the particulate material to the at least one first outermost outlet also delivers the particulate material to at least one center outlet to dispense half the amount of particulate material to the center mid-row.

12. The spreader of claim 10, wherein the second metering element is constructed as the first metering element, and the second metering element is configured to deliver the particulate material to the at least one second outermost outlet.

13. The spreader of claim 12, wherein the second metering element is configured to deliver the particulate material to the at least one center outlet to dispense half the amount of particulate material to the center mid-row.

14. The spreader of claim 10, wherein the apron comprises an endless belt.

15. The spreader of claim 10, wherein the apron comprises a set of meter rollers.

16. The spreader of claim 6, further comprising a plurality of air lines and a blower configured to transport the particulate material from the metering device to the plurality of outlets.

17. A method of applying particulate material to a field using a boom spreader, the method comprising:
   driving a boom spreader in a first direction along a first driving line in a first swath of a field planted with a crop, the field comprising a plurality of mid-rows between a plurality of crop rows, the mid-rows in the first swath comprising first and second outermost mid-rows and at least one mid-row between the first and second outermost mid-rows, the boom spreader comprising a plurality of transversely spaced-apart outlets through which a particulate material is applied to the mid-rows, the plurality of transversely spaced-apart outlets comprising first and second outermost outlets configured to apply the particulate material to the first and second outermost mid-rows and at least one inner outlet configured to apply the particulate material to the at least one mid-row between the first and second outermost mid-rows;

applying a particulate material to the first and second outermost mid-rows in an amount that is half an amount of the particulate material applied to the at least one mid-row between the first and second outermost mid-rows;

driving the boom spreader along a second driving line in a second swath of the field in a second direction opposite the first direction, the second swath comprising the second outermost mid-row, a third outermost midrow and at least one mid-row between the second and third outermost mid-rows, the first and second outermost outlets configured to apply the particulate material to the second and third outermost mid-rows and the at least one inner outlet configured to apply the particulate material to the at least one mid-row between the second and third outermost mid-rows; and, applying the particulate material to the second and third outermost mid-rows in an amount that is about half an amount of the particulate material applied to the at least one mid-row between the second and third outermost mid-rows, the second outermost mid-row thereby receiving the same amount of the particulate material as the at least one mid-row between the first and second outermost mid-rows of the first swath and the same amount of the particulate material as the at least one mid-row between the second and third outermost mid-rows of the second swath.

18. The method of claim 17, wherein the boom spreader comprises:

at least one innermost outlet configured to apply the particulate material to the at least one mid-row on the driving line between the outermost mid-rows;

first and second booms transversely extendible over the field on either side of the spreader, the first boom comprising the first outermost outlet and at least one other outlet between the first outermost outlet and the at least one innermost outlet;

the second boom comprising the second outermost outlet and at least one other outlet between the second outermost outlet and the at least one innermost outlet; and, a metering device comprising first and second independently controllable metering elements, the first metering element delivering the particulate material to the outlets on the first boom and the at least one innermost outlet, the first outermost outlet and the innermost outlet receiving half the amount of particulate material as the at least one other outlet, the second metering element delivering the particulate material to the outlets on the second boom and the at least one innermost outlet, the second outermost outlet and the innermost outlet receiving half the amount of particulate material as the at least one other outlet.

19. The method of claim 18, further comprising switching off the first metering element when the first boom is over a portion of the field, which has already received the particulate material or which is not intended to receive the particulate material.

* * * * *